(12) United States Patent
Baker et al.

(10) Patent No.: US 9,958,104 B2
(45) Date of Patent: May 1, 2018

(54) MOTOR LEAD WITH HEAT DEFLECTING LAYER FOR SUBMERSIBLE WELL PUMP

(71) Applicant: Baker Hughes Incorporated, Houston, TX (US)

(72) Inventors: Ty L. Baker, Guthrie, OK (US); Leslie C. Reid, Coweta, OK (US)

(73) Assignee: Baker Hughes, a GE Company, LLC, Houston, TX (US)

( * ) Notice: Subject to any disclaimer, the term of this patent is extended or adjusted under 35 U.S.C. 154(b) by 524 days.

(21) Appl. No.: 14/584,402

(22) Filed: Dec. 29, 2014

(65) Prior Publication Data

US 2015/0184790 A1 Jul. 2, 2015

Related U.S. Application Data

(60) Provisional application No. 61/921,233, filed on Dec. 27, 2013.

(51) Int. Cl.
*F04C 13/00* (2006.01)
*F04D 13/06* (2006.01)
*H04B 7/04* (2017.01)
*H01B 7/18* (2006.01)
*F16L 59/12* (2006.01)
*H01B 7/04* (2006.01)
*F04C 15/00* (2006.01)

(52) U.S. Cl.
CPC ............ *F16L 59/12* (2013.01); *F04C 13/008* (2013.01); *F04C 15/0096* (2013.01); *F04D 13/0693* (2013.01); *H01B 7/046* (2013.01); *H01B 7/18* (2013.01); *F04C 2240/70* (2013.01); *F04C 2240/803* (2013.01); *Y10T 137/7043* (2015.04)

(58) Field of Classification Search
CPC ... F16L 59/168; F04C 15/0096; F04C 13/008; F04C 2240/803; F04C 2240/70; F04D 13/0693; F04D 13/086; F04D 29/007; F04D 29/588; F04D 29/5893; H01B 7/046; H01B 7/18; H01B 9/025; H01B 11/1041
See application file for complete search history.

(56) References Cited

U.S. PATENT DOCUMENTS 2,829,190 A * 4/1958 Comlossy, Jr. .......... H02G 9/06
166/65.1
4,337,969 A * 7/1982 Escaron ................ E21B 17/026
166/65.1

(Continued)

*Primary Examiner* — Bryan Lettman
*Assistant Examiner* — Timothy Solak
(74) *Attorney, Agent, or Firm* — Bracewell LLP; James E. Bradley

(57) ABSTRACT

A motor lead extends alongside an electrical pump assembly for supplying electrical power to the motor. The motor lead has electrical power wires positioned side-by-side in a sub assembly. Each of the electrical power wires has an electrical conductor encased in an insulation layer, which in turn is encased in a lead sheath. A metallic band armor wraps around the sub assembly. A thermal barrier layer is located between an inward facing side of the sub assembly and the pump assembly. The thermal barrier layer is formed of thermal insulation material and has a width at least equal to a width of the sub assembly. The motor lead is free of any thermal barrier layers on the outward facing side of the sub assembly to as to allow heat within the sub assembly to dissipate outward.

16 Claims, 2 Drawing Sheets

(56) References Cited

U.S. PATENT DOCUMENTS

| | | | |
|---|---|---|---|
| 4,681,169 A * | 7/1987 | Brookbank, III | E21B 17/1035 |
| | | | 166/385 |
| 5,426,264 A | 6/1995 | Livingston et al. | |
| 5,431,759 A | 7/1995 | Neuroth | |
| 5,742,008 A | 4/1998 | Dalrymple | |
| 5,782,301 A | 7/1998 | Neuroth et al. | |
| 5,973,270 A * | 10/1999 | Keller | E21B 17/1035 |
| | | | 174/136 |
| 6,260,615 B1 * | 7/2001 | Dalrymple | E21B 36/04 |
| | | | 166/302 |
| 7,611,339 B2 | 11/2009 | Tetzlaff et al. | |
| 8,143,523 B2 | 3/2012 | Dalrymple et al. | |
| 8,382,508 B1 | 2/2013 | Frey et al. | |

* cited by examiner

MOTOR LEAD WITH HEAT DEFLECTING LAYER FOR SUBMERSIBLE WELL PUMP

CROSS REFERENCE TO RELATED APPLICATION

This application claims priority to provisional application 61/921,233, filed Dec. 27, 2013.

FIELD OF THE DISCLOSURE

This disclosure relates in general to submersible well pump assemblies and in particular to a thermal insulation layer or cradle for the motor lead.

BACKGROUND

Electrical submersible pumps (ESP) are employed in many oil wells to pump well fluid from the well. A typical ESP has an electrical motor coupled to the pump for driving the pump. A seal section or pressure equalizer connects to the motor for equalizing a pressure of dielectric lubricant inside with the well fluid pressure on the exterior. Usually, the pressure equalizer locates between the motor and pump. The ESP may also have a gas separator connected to a lower end of the pump. A string of production tubing usually supports the ESP within the well. An electrical power cable extends downward alongside the tubing from a well head assembly. A lower portion of the power cable, referred to as a motor lead, extends alongside the pump, gas separator, if employed, and pressure equalizer to a connector at the upper end of the motor.

The motor lead comprises a flat cable with three electrical power wires side by side in a flat configuration. Each electrical power wire includes a copper core or conductor with one or more layers of electrical insulation. A lead sheath may be extruded around the electrical insulation to provide protection in gassy wells. An outer armor band wraps helically around the sub assembly of electrical power wires.

In some wells, the pump can become hot enough to cause damage to the motor lead. Typically, the heat occurs as a result a lack of well fluid flowing through the pump due to gas locking or pump-off conditions. The excess heat in the pump, as well as any excess heat in the pressure equalizer and/or gas separator, may transfer to the motor lead. The excess heat is particularly a problem with motor leads having lead sheaths. Excessive heat causes the lead sheaths to soften and change shape, becoming thinner. If too thin, the lead sheaths may not be able to provide the desired protection to the electrical conductor insulation layers.

SUMMARY

An electrical submersible pump assembly has a plurality of modules including a pump, a motor, and a pressure equalizer for reducing a pressure differential between lubricant in the motor and hydrostatic pressure of well fluid. A motor lead extends alongside at least some of the modules for supplying electrical power to the motor. The motor lead has insulated electrical conductors positioned side-by-side in a sub assembly. The sub assembly is helically wrapped in a metallic band armor. A thermal barrier layer is located between the inward facing side of the sub assembly and at least one of the modules to reduce heat transfer from the module to the sub assembly. The thermal barrier layer is located only on the inward facing side of the sub assembly to facilitate heat transfer in an outward direction from the sub assembly.

The thermal barrier layer has a width at least equal to a width of the sub assembly. The thermal barrier layer has a central portion with side edges on opposite edges of the central portion. The side edges curve outward from the central portion.

The insulated electrical conductors comprise a central insulated electrical conductor and two outboard insulated electrical conductors on opposite sides of the central insulated electrical conductor. A single plane passes through a centerline of each of the insulated electrical conductors of the sub assembly. The thermal barrier layer has a central portion with side edges on opposite edges of the central portion. The side edges curve outward from the central portion and are located alongside the outboard insulated electrical conductors.

Preferably, the thermal barrier layer has a length at least equal to a length of the module alongside. In one embodiment, the thermal barrier layer has an inward facing side in contact with the armor and an outward facing side in contact with the insulated electrical conductors. In that embodiment, the thermal barrier layer comprises a cradle located between the insulated electrical conductors and the armor. The cradle has on an outer side a plurality of elongated side by side cavities, each of the cavities receiving a portion of one of the insulated electrical conductors. Each of the cavities may be separated from adjacent ones of the cavities by an elongated outward protruding ridge that extends between and separates adjacent ones of the insulated electrical conductors. Preferably, the cradle has side edges that curve outward around the sub assembly.

In another embodiment, the thermal barrier layer is located between the armor and one of the modules. In that embodiment, the thermal barrier layer is bonded to the inward facing side of the motor lead.

BRIEF DESCRIPTION OF THE DRAWINGS

So that the manner in which the features, advantages and objects of the disclosure, as well as others which will become apparent, are attained and can be understood in more detail, more particular description of the disclosure briefly summarized above may be had by reference to the embodiment thereof which is illustrated in the appended drawings, which drawings form a part of this specification. It is to be noted, however, that the drawings illustrate only a preferred embodiment of the disclosure and is therefore not to be considered limiting of its scope as the disclosure may admit to other equally effective embodiments.

DETAILED DESCRIPTION OF THE DISCLOSURE

Figure 1:
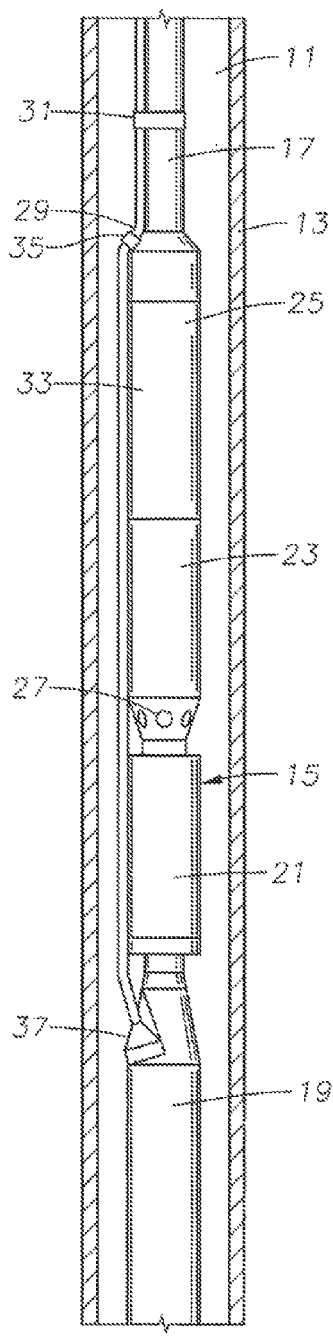
FIG. 1 is a side view of an electrical submersible pump assembly in accordance with this disclosure and installed in a well.

The methods and systems of the present disclosure will now be described more fully hereinafter with reference to the accompanying drawings in which embodiments are shown. The methods and systems of the present disclosure may be in many different forms and should not be construed as limited to the illustrated embodiments set forth herein; rather, these embodiments are provided so that this disclosure will be thorough and complete, and will fully convey its scope to those skilled in the art. Like numbers refer to like elements throughout.

It is to be further understood that the scope of the present disclosure is not limited to the exact details of construction, operation, exact materials, or embodiments shown and described, as modifications and equivalents will be apparent to one skilled in the art. In the drawings and specification, there have been disclosed illustrative embodiments and, although specific terms are employed, they are used in a generic and descriptive sense only and not for the purpose of limitation.

Referring to FIG. 1, a well 11 has casing 13 that is perforated or has other openings to admit well fluid. A pump assembly 15 is illustrated as being supported on production tubing 17 extending into well 11. Alternately, pump assembly 15 could be supported by other structure, such as coiled tubing. Although shown installed vertically, pump assembly 15 could be located within an inclined or horizontal section of well 11. The terms "upper", "lower" and the like as used herein only for convenience, because pump assembly 15 can be operated in inclined or horizontal sections of a well. Pump assembly 15 has several modules, including a motor 19, normally a three-phase electrical motor. A motor protector or seal section 21 connects to motor 19 and has components, such as a bladder, for reducing a pressure differential between lubricant in motor 19 and the hydrostatic pressure of well fluid. Seal section 21 may be mounted to an upper end of motor 19 or alternately to a lower end. An optional gas separator 23 connects to the upper end of seal section 21 in this example.

A pump 25 connects to gas separator 23 if one is employed; if a gas separator is not used, pump 25 may connect to seal section 21, as shown, or to motor 19. Pump 25 has a well fluid intake 27 that will be in gas separator 23 if one is used, and if not, at a base of pump 25. Pump 25 is normally a rotary pump, such as a centrifugal or progressing cavity pump, but it could be a reciprocating pump. The connections between the modules of pump assembly 15 are shown as bolted flanges, but they could be threaded connections.

A power cable 29 extends from a wellhead (not shown) alongside tubing 17 for supplying power to motor 19. Spaced apart clamps 31 (only one shown) secure power cable 29 to production tubing 17. A motor lead 33, which may be considered to be a lower part of power cable 29, connects to a lower end of power cable 29 by a splice 35 in this example. Motor lead 33 extends alongside pump assembly 15 and has an electrical connector 37 on its lower end that secures to a receptacle at the upper end of motor 19. Splice 35 is illustrated at the upper end of pump 25, but it could be a considerable distance above pump 25. Motor lead 33 often has a length from 80 to 90 feet.

Figure 3:
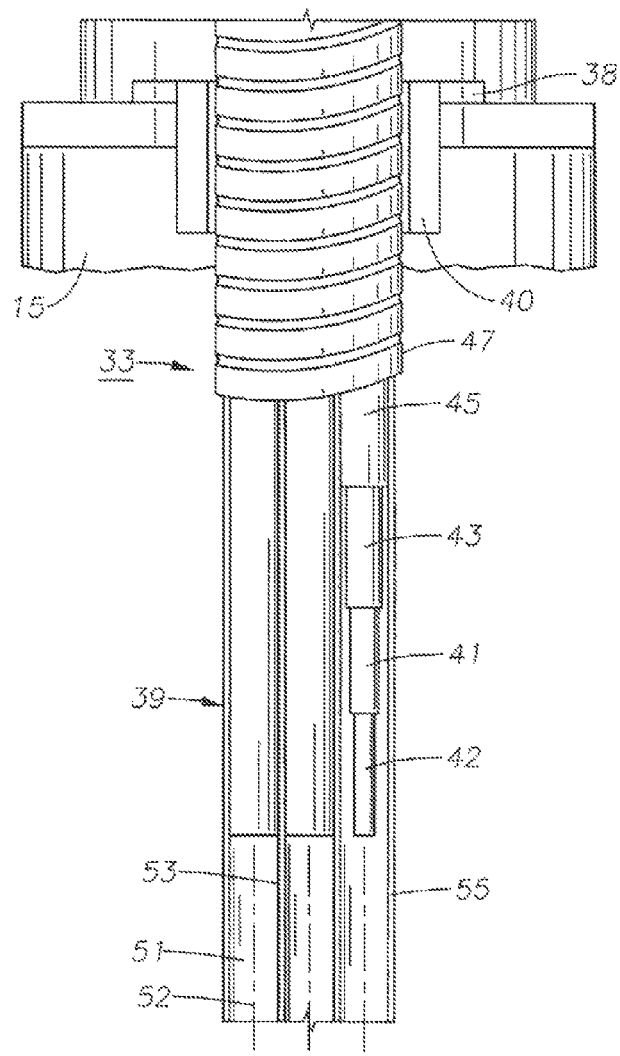
FIG. 3 is a side view of part of the motor lead of FIG. 2, illustrating part of one of the pump modules, and showing portions of the insulation and armor removed.

As schematically illustrated in FIG. 3, motor lead protectors 38 (one shown) may be attached to pump assembly 15 at various connections between the modules. Each motor lead protector 38 comprises a bracket having a pair of outward protruding flanges 40 extending longitudinally relative to the axis of pump assembly 15. Motor lead 33 fits between flanges 40, which protrude radially past motor lead 33 to provide protection to motor lead 33.

Figure 2:
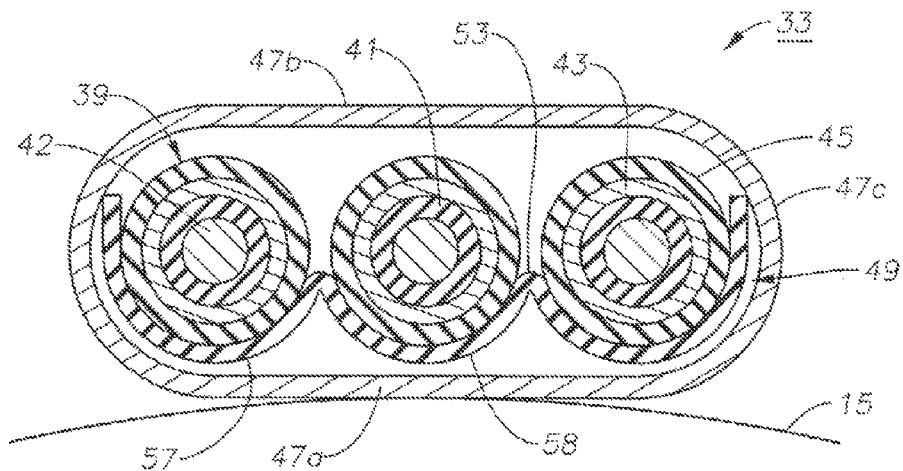
FIG. 2 is a sectional view of a first embodiment of the motor lead of the pump assembly of FIG. 1.

As shown in FIGS. 2 and 3, motor lead 33 has electrical power wires or insulated conductors 39, normally three, which are oriented side-by-side, defining a central insulated conductor 39 and two outboard insulated conductors 39. A single plane passes through the center line of each insulated conductor 39, thus motor lead 33 is considered to have a flat configuration. Each insulated conductor 39 has a copper wire or core 42 with a separate electrical insulation layer 41 surrounding each core 42. Insulation layer 41 may be of any conventional material used for insulating conductor cores 42 in submersible pump motor leads, such as an ethylene propylene diene monomer (EPDM). A separate lead sheath 43 optionally encases each insulation layer 41. Lead sheath 43 is impervious to chemical or gas migration. Lead sheath 43 reduces decompression when retrieving pump assembly 15 and is particularly used for wells that have hot and gassy conditions. A bedding tape 45 may be wrapped separately around each lead sheath 43 for mechanical protection of each lead sheath 43.

An armor 47 wraps around the sub assembly of three insulated and sheathed conductors 39. Armor 47 comprises a steel band wrapped helically around the sub assembly of the three insulated and sheathed conductors 39. Armor 47 has a flat inward-facing side 47a relative to the longitudinal axis of pump assembly 15. Armor 47 also has a flat outward facing side 47b, and curved or rounded side edges 47c joining the inward and outward, facing sides 47a, 47b. The turns of armor 47 overlap each other.

In some wells, pump 25 can become hot enough to cause damage to motor lead 33. Typically, the heat occurs as a result a lack of well fluid flowing through pump 25 due to gas locking or pump-off conditions. The excess heat in pump 25, as well as any excess heat in seal section 21 and gas separator 23, may transfer to motor lead 33 because motor lead 33 lies alongside pump assembly 15 down to motor 19 and is in contact with the outer housings of pump assembly 15. The excess heat is particularly a problem with motor leads having lead sheaths, such as lead sheaths 43. Excess heat causes the lead sheaths to soften and change shape, becoming thinner. If too thin, the lead sheaths may not be able to provide the desired protection to the electrical conductor insulation layers.

In the first embodiment, a barrier layer comprising a cradle 49 (FIG. 2) is used to reduce heat transfer to insulated conductors 39. Cradle 49 may be located within armor 47 and installed while armor 47 is being wrapped. Cradle 49 is preferably in direct contact with the inward-facing surfaces of lead sheath bedding tape 45, or with lead sheaths 43 if bedding tape 45 is not used. The inward-facing sides or surfaces of insulated and lead sheathed conductors 39 are the sides that face generally radially toward the longitudinal axis of pump assembly 15. Preferably cradle 49 blocks only the inward-facing sides. Cradle 49 has a width that completely covers the inward facing side of the sub assembly of the three lead sheathed conductors 39. Motor lead 33 is free of any thermal insulation structure on the outward-facing sides of insulated and lead sheathed conductors 39. Heat occurring within the insulated and lead sheathed conductors 39 is thus free to radiate outwardly. Cradle 49 could extend the entire length of motor lead 33, or it could be shorter and located in certain areas, such as alongside pump 25 or seal section 15. Further, separate sections of cradle 49 could be spaced apart from each other along the length of motor lead 33. In one embodiment, cradle 49 has a length equal to a length of the module that it is adjacent, such as pump 25, gas separator 23 and/or seal section 21.

In this embodiment, cradle 49 comprises an elongated strip or layer of thermal insulation or heat deflecting material. Cradle 49 may be flexible so that it will roll onto a reel along with motor lead 33 for transport to a well and a roll over a sheave when lowering pump assembly 15 into well 11. Cradle 49 may be made from a ceramic coated carbon fiber that would provide resistance to compression forces and heat.

The outward-facing side of cradle 49 may have three elongated semi-cylindrical cavities 51 (FIG. 3), each for closely receiving one of the insulated and lead sheathed conductors 39. A central cavity 51 receives a portion of the central insulated conductor 39 and two outboard cavities 51 receive a portion of the outboard insulated conductors 39. Cavities 51 extend side-by-side the full length of cradle 49. Each cavity 51 has a center line 52 that coincides with the centerline of one of the insulated and lead sheathed conductors 39. A straight ridge 53 protrudes outward and separates each cavity 51 from an adjacent cavities 51. Ridges 53 are parallel with centerlines 52 and extend partly between and separate the central insulated conductor 39 from the two outboard insulated conductors 39. The central cavity 51 extends less than 180 degrees measured transversely from one ridge 53 to the other. The two lateral or outboard cavities 51 have side edge walls 55 that may protrude farther outward than ridges 53, each terminating in a straight portion. Alternately, cradle 49 could comprises a simple flat strip or layer, rather than having cavities 51.

Cradle 49 has an inward-facing side 57 (FIG. 2) that is at least partially contacted by armor 47. In the embodiment shown, cradle 49 has a constant thickness, thus inward-facing side 57 has a contour that is defined by the three outward-facing cavities 51. That is, inward-facing side 57 comprises three side-by-side partially cylindrical and convex surfaces 58 that are contacted by armor 47 and face inward toward the axis of pump assembly 15. Alternately, rather than convex cylindrical surfaces 58, the back or inward-facing side 57 could be flat from one side edge to the other.

During operation, heat generated within pump 25, seal section 21 and gas separator 23 radiates outward. Cradle 49 deflects or blocks at least part of the heat that would otherwise pass into lead sheaths 43 of each insulated conductor 39. What heat that does occur within insulated conductors 39 is free to radiate outward since cradle 49 covers only the inward facing sides of insulated conductors 39 in the preferred embodiment.

Figure 4:
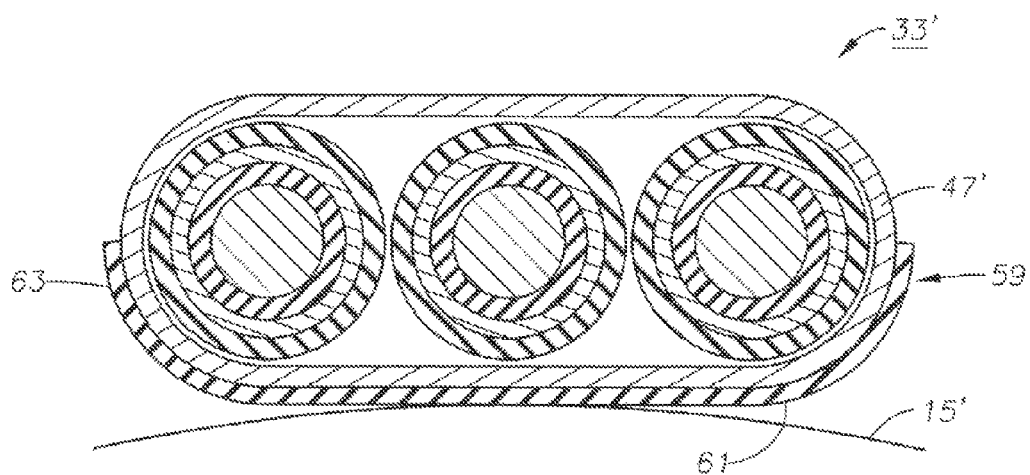
FIG. 4 is a sectional view of an alternate embodiment of the motor lead of FIG. 2.

In the second embodiment shown in FIG. 4, the thermal barrier comprises a layer 59 bonded to the exterior and inward facing side of armor 47'. Layer 59 may be a coating, tape or sheet of a thermally insulating material. Layer 59 could be formed of flexible ceramics. Layer 59 may be bonded to the inner side of armor 47'. Layer 59 may have a generally flat portion 61 that will be in contact with one or more of the modules of pump assembly 15'. In the embodiment shown, layer 59 has two partially cylindrical side edges 63 that curve outward and are applied to the side edges of armor 47'. Layer 59 covers only the back or inward-facing side of motor lead 33', allowing heat absorbed in motor lead 33' to radiate outward. Side edges 63 have outer ends that protrude outward from one or more of the modules of pump assembly 15' a lesser distance than the outward facing side of armor 47'.

While the disclosure has been shown in only one of its forms, it should be apparent to those skilled in the art that it is susceptible to various changes.

The invention claimed is:

1. An electrical submersible pump assembly, comprising:
a plurality of modules including a pump, a motor, and a pressure equalizer for reducing a pressure differential between lubricant in the motor and hydrostatic pressure of well fluid;
a motor lead extending alongside at least some of the modules for supplying electrical power to the motor, comprising:
insulated electrical conductors positioned side-by-side in a sub assembly, the sub assembly being helically wrapped in a metallic band armor, the sub assembly having an inward facing side and an outward facing side relative to a longitudinal axis of the pump assembly;
a thermal barrier layer located between the inward facing side of the sub assembly and extending continuously along a full length of said at least one of the modules to reduce heat transfer from said at least one of the modules to the sub assembly, the thermal barrier layer has a central portion with side edges on opposite edges of the central portion, the side edges being curved outward, in a direction away from the pump assembly, from the central portion and having outer ends that protrude outward from said one of the modules a lesser distance than an outward facing side of the armor; and wherein
the thermal barrier layer is located only on the inward facing side of the sub assembly to facilitate heat transfer in an outward direction from the sub assembly.

2. The assembly according to claim 1, wherein:
the thermal barrier layer has a width that completely covers the inward facing side of the sub assembly.

3. The assembly according to claim 1, wherein:
the insulated electrical conductors comprise a central insulated electrical conductor and outboard insulated electrical conductors on opposite sides of the central insulated electrical conductor;
a single plane passes through a centerline of each of the insulated electrical conductors of the sub assembly.

4. The assembly according to claim 1, wherein:
the thermal barrier layer is formed of flexible ceramics.

5. The assembly according to claim 1, wherein:
the thermal barrier layer has an inward facing side in contact with the armor and an outward facing side in contact with the insulated electrical conductors.

6. The assembly according to claim 1, wherein:
the thermal barrier layer comprises a cradle located between the insulated electrical conductors and the armor; and
the cradle has on an outer side a plurality of elongated side by side cavities, each of the cavities receiving a portion of one of the insulated electrical conductors.

7. The assembly according to claim 1, wherein:
the thermal barrier layer comprises a cradle located between the insulated electrical conductors and the armor;
the cradle has on an outer side a plurality of elongated side by side partially cylindrical cavities, each of the cavities receiving a portion of one of the insulated electrical conductors;
each of the cavities is separated from adjacent ones of the cavities by an elongated outward protruding ridge that extends between and separates adjacent ones of the insulated electrical conductors; and
the cradle has side edges that curve outward around the sub assembly.

8. The assembly according to claim 1, wherein:
the thermal barrier layer is located between the armor and said one of the modules.

9. An electrical submersible pump assembly, comprising:
a plurality of modules including a pump, a motor, and a pressure equalizer for reducing a pressure differential between lubricant in the motor and hydrostatic pressure of well fluid;
a motor lead extending alongside at least one of the modules for supplying electrical power to the motor, comprising:
electrical power wires positioned side-by-side in a sub assembly such that a single plane passes through a centerline of each of the electrical power wires, each of the electrical power wires comprising an electrical conductor encased in an insulation layer, which in turn is encased in a lead sheath, the sub assembly being helically wrapped in a metallic band armor, the sub assembly having an inward facing side and an outward facing side relative to a longitudinal axis of the pump assembly;
a thermal barrier layer between the inward facing side of the sub assembly and said at least one of the modules, the thermal barrier layer having a length at least as long as said one of the modules and not greater than a length of the sub assembly;
the thermal barrier layer being formed of thermal insulation material and having a width that completely covers the inward facing side of the sub assembly, the thermal barrier layer has a central portion with side edges on opposite edges of the central portion, the side edges being curved outward, in a direction away from the pump assembly, from the central portion and extending along opposite side edges of the sub assembly; and the side edges have outer ends that protrude outward from said one of the modules a lesser distance than an outward facing side of the armor; and wherein
the motor lead is free of any thermal barrier layers on the outward facing side of the sub assembly to allow heat within the sub assembly to dissipate outward.

10. The assembly according to claim 9, wherein:
the thermal barrier layer is located between the armor and the electrical power wires.

11. The assembly according to claim 9, wherein:
the thermal barrier layer comprises a cradle located between the electrical power wires and the armor; and
the cradle has on an outward facing side a plurality of side by side elongated cavities, each of the cavities receiving a portion of one of the electrical power wires.

12. The assembly according to claim 9, wherein:
the thermal barrier layer comprises a cradle located between the electrical power wires and the armor;
the cradle has on an outward facing side a plurality of elongated side by side partially cylindrical cavities, each of the cavities receiving a portion of one of the electrical power wires;
each of the cavities is separated from adjacent ones of the cavities by an elongated ridge that extends partially between and separates adjacent ones of the electrical power wires; and
the cradle has side edges that curve outward and extend along side edges of the sub assembly.

13. The assembly according to claim 9, wherein:
the thermal barrier layer is located between the armor and said one of the modules.

14. The assembly according to claim 9, wherein:
the thermal insulation material of the thermal barrier layer comprises ceramic coated carbon fiber.

15. An electrical submersible pump assembly, comprising:
a plurality of modules including a pump, a motor, and a pressure equalizer for reducing a pressure differential between lubricant in the motor and hydrostatic pressure of well fluid;
a power cable;
a motor lead secured to a lower end of the power cable and extending alongside at least one of the modules for supplying electrical power to the motor, the motor lead having electrical power wires positioned side-by-side, each of the electrical power wires comprising an electrical conductor encased in an insulation layer, which in turn is encased in a lead sheath, the electrical power wires being helically wrapped in a metallic band armor, the armor having a flat inward facing side and a flat outward facing side relative to a longitudinal axis of the pump assembly;
a thermal barrier layer between the inward facing side of the armor and said at least one of the modules to restrict heat from said at least one of the modules transferring to the lead sheaths, the thermal barrier layer extending continuously along a full length of said one of the modules;
the thermal barrier layer being formed of thermal insulation material and having a width at least equal to a width of the inward facing side of the armor, the thermal barrier layer has a central portion with side edges on opposite edges of the central portion, the side edges being curved outward, in a direction away from the pump assembly, from the central portion and having outer ends that protrude outward from said one of the modules a lesser distance than an outward facing side of the armor; and wherein
the motor lead is free of any thermal barrier layers on the outward facing side of the armor to allow heat within the motor lead to dissipate outward.

16. The assembly according to claim 15, wherein the thermal barrier layer has a flat inward facing side in contact with said one of the modules.

* * * * *